(12) United States Patent
Hoffmann (10) Patent No.: US 9,989,002 B2
(45) Date of Patent: Jun. 5, 2018

(54) TURBOCHARGER AND METHOD OF OPERATING TURBOCHARGER

(71) Applicants: Hyundai Motor Europe Technical Center GmbH, Russelsheim (DE); Hyundai Motor Company, Seoul (KR); Kia Motors Corporation, Seoul (KR)

(72) Inventor: Stefan Hoffmann, Russelsheim (DE)

(73) Assignees: Hyundai Motor Europe Technical Center GmbH, Russelsheim (DE); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 14/485,533

(22) Filed: Sep. 12, 2014

(65) Prior Publication Data

US 2015/0152779 A1    Jun. 4, 2015

(30) Foreign Application Priority Data

Dec. 3, 2013    (DE) .......................... 10 2013 224 730

(51) Int. Cl.
*F02D 23/00*    (2006.01)
*F02B 33/44*    (2006.01)
(Continued)

(52) U.S. Cl.
CPC ........ *F02D 41/1448* (2013.01); *F02B 37/186* (2013.01); *F02B 37/22* (2013.01);
(Continued)

(58) Field of Classification Search
CPC ...................................................... F02B 37/18
(Continued)

(56) References Cited

U.S. PATENT DOCUMENTS

| 6,993,908 B2 * | 2/2006 | Akao | .................... F02D 41/222 60/601 |
| 2003/0024246 A1 * | 2/2003 | Beck | ........................ F02B 1/12 60/599 |

(Continued)

FOREIGN PATENT DOCUMENTS

| JP | 2009-13873 A | 1/2009 |
| JP | 4631598 B2 | 11/2010 |

(Continued)

*Primary Examiner* — Deming Wan
(74) *Attorney, Agent, or Firm* — Morgan, Lewis & Bockius LLP (57) ABSTRACT

Disclosed are a turbocharger for a combustion engine and a method of operating a turbocharger. The turbocharger may include a variably positionable flow restrictor for restricting flow in a turbocharger inlet of the turbocharger by an amount dependent on a flow restrictor position. The method may include determining an operating point variable of the combustion engine, controlling a first actuator to exert on the flow restrictor a first actuating force for varying the flow restrictor position depending on the operating point variable, determining a crank angle variable of the combustion engine, and controlling a second actuator to exert on the flow restrictor a second actuating force for varying the flow restrictor position depending on the crank angle variable.

12 Claims, 7 Drawing Sheets

(51) Int. Cl.
*F02D 7/02* (2006.01)
*F02D 1/04* (2006.01)
*F02D 41/14* (2006.01)
*F02D 41/00* (2006.01)
*F02B 37/18* (2006.01)
*F02B 37/22* (2006.01)

(52) U.S. Cl.
CPC ..... *F02D 41/0007* (2013.01); *F02D 41/1445* (2013.01); *F02D 2250/34* (2013.01); *Y02T 10/144* (2013.01)

(58) Field of Classification Search
USPC ................ 60/602, 605.1, 605.2; 37/186
See application file for complete search history.

(56) References Cited

U.S. PATENT DOCUMENTS

2011/0072815 A1* 3/2011 Pesiridis .............. F01D 17/141
60/615
2012/0222418 A1* 9/2012 Watanabe ............. F02B 37/183
60/602

FOREIGN PATENT DOCUMENTS

KR 10-2007-0092516 A 9/2007
WO WO 2006/061588 A1 6/2006

* cited by examiner

TURBOCHARGER AND METHOD OF OPERATING TURBOCHARGER

CROSS-REFERENCE TO RELATED APPLICATION

The present application claims priority of German Patent Application Number 102013224730.3 filed on Dec. 3, 2013, the entire contents of which application are incorporated herein for all purposes by this reference.

BACKGROUND OF INVENTION

Field of Invention

The present invention relates to a turbocharger for a combustion engine, and a method of operating such a turbocharger. More specifically, the invention relates to a turbocharger, and a method of operating a turbocharger, which has a variable turbine geometry.

Description of Related Art

Turbochargers for gasoline and diesel internal combustion engines are known devices used in the art for pressurizing or boosting the intake air stream, routed to a combustion chamber of the engine, by using the flow of exhaust gas exiting the engine. Specifically, the exhaust gas exiting the engine is routed into a turbine housing of a turbocharger in a manner that causes an exhaust gas-driven turbine to spin within the housing, thereby driving a radial air compressor that is mounted onto a common shaft with the turbine. A turbocharged engine can be more powerful and efficient than a naturally aspirated engine because the turbine forces more air, and proportionately more fuel, into the combustion chamber than atmospheric pressure alone.

To achieve efficient and powerful operation of the engine under different load and speed conditions, so-called variable-geometry turbochargers (VGTs) allow the amount of exhaust gas that is passed through the turbine housing to be regulated by varying the turbine geometry, typically by selectively opening or closing an exhaust gas channel or passage to the turbine. For example, the position of a flow-restricting member is controlled by a pneumatic or electric actuator to a position that depends on the operating point of the engine.

Conventionally, such control does not take into account pressure pulsations in the exhaust gas channel, which originate from the operation of the cylinders and valves of the combustion engine, but is based on average pressure values over one or more engine cycles. That means, the flow-restricting member is set to a compromise position that is optimal for the highest and lowest pressure values occurring in the pulsations. In order to recover more of the energy present in the pulsating exhaust gas stream, WO 2006/061588 A1 suggests a flow control device for a turbocharger, which includes a sensor for sensing a measure of turbo charger inlet pressure, and a controller arranged to control the position of the flow restrictor based on sensed pressure in the turbocharger inlet.

However, due to the rapid pressure changes in the exhaust gas pressure pulsations, controlling the position of the flow restrictor based on sensed pressure places high demands on the time resolution and processing power of the controller employed in the control device, furthermore leading to high electrical power consumption. It therefore is desirable to reduce the amount of processing power required while recovering a high proportion of the energy present in the pulsating exhaust gas stream.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a method of operating a turbocharger for a combustion engine, wherein the turbocharger includes a variably positionable flow restrictor for restricting flow in a turbocharger inlet of the turbocharger by an amount dependent on a flow restrictor position. The method may include a step of determining an operating point variable of the combustion engine, a step of controlling a first actuator to exert, on the flow restrictor, a first actuating force for varying the flow restrictor position depending on the operating point variable, a step of determining a crank angle variable of the combustion engine, and a step of controlling a second actuator to exert, on the flow restrictor, a second actuating force for varying the flow restrictor position depending on the crank angle variable.

Because the operating point of the combustion engine changes on a slower timescale than the timescale of pressure pulsations of the exhaust gas of the combustion engine, neither the step of determining the operating point variable of the combustion engine nor the step of controlling the first actuator require high processing power. Likewise, high processing power is not required for the step of determining the crank angle variable because the crank angle, being linked to the rotational motion of the engine crank, changes steadily in comparison to e.g. pressure changes due to exhaust gas pulsations. Moreover, both operating point variable and a crank angle variable are typically by default provided in control devices of modern combustion engines such as used in automobiles, in which case no additional processing power will be required for acquiring these variables. And, because the first actuating force and the second actuating force are each applied to the flow restrictor, no processing power is required also for calculating a complex, irregular and fast-changing control signal, as would be required for setting the flow restrictor position with only a single actuator. Consequently, the present invention enables to increase boost pressure, improve dynamic response and reduce fuel consumption of the engine without excessive use of processing power and electrical energy.

The inventive turbocharger may include a variably positionable flow restrictor for restricting flow in a turbocharger inlet of the turbocharger by an amount dependent on a flow restrictor position, an operating point variable determiner, which determines an operating point variable of the combustion engine, a first actuator adapted to exert on the flow restrictor a first actuating force for varying the flow restrictor position depending on the operating point variable, a crank angle variable determiner, which determines a crank angle variable of the combustion engine, and a second actuator adapted to exert on the flow restrictor a second actuating force for varying the flow restrictor position depending on the crank angle variable.

According to one aspect of the present invention, the operating point variable may include at least one of an engine speed and/or an engine load of the combustion engine. Engine speed and an engine load are provided by default in typical control devices of modern combustion engines such that they can be obtained in an easy way, without requiring much processing power. Here, both variables may be regarded as forming together the operating point variable.

According to another aspect of the present invention, the method may further include a step of providing a modulation function, which defines a desired modulation of the flow restrictor position, wherein the step of controlling the second actuator is performed based on the modulation function. This is advantageous because the function is enabled to be provided as a function of time such that for an extended time span the crank angle variable does not have to be determined. The modulation function may include at least one adjustable parameter for adjusting the modulation function, and the step of providing the modulation function may include determining the at least one adjustable parameter based on the operating point variable. In this way, the modulation function is enabled to be flexibly adjusted to changes in the operating point variable, without requiring much processing power. The at least one adjustable parameter may include at least one of an offset to a top dead center of the combustion engine, a modulation base level, a modulation amplitude, a positive modulation amplitude ramp time, a negative modulation amplitude ramp time, and/or a modulation period.

According to an aspect of the present invention, the modulation function may be substantially sinusoidal. This is especially advantageous because of the simple sinusoidal form, which can be realized in an easy way, thus further reducing the required processing power. For example, it is possible to define the modulation function by only four parameters, such as by an amplitude, a frequency, an offset to a top dead center of the engine, and a base level of the modulation function.

According to an aspect of the present invention, the step of controlling the second actuator may be performed selectively depending on the operating point variable. This enables to control the flow restrictor position according to the crank angle e.g. only for selected operating point regions of the combustion engine where it is thought to be desirable, switching it off in other regions where only the step of controlling the first actuator according to the operating point variable is performed. In this way, the control of the second actuator can be simplified and made more efficient since it can be provided specifically for the selected operating point regions. Furthermore, the amount of processing power required is enabled to be reduced.

According to some aspects of the present invention, at least one of the first and/or second actuators may include a fluidic actuator, i.e. an actuator controllable by fluid, such as a pneumatic or hydraulic actuator. The first actuator may include a first fluid valve and the second actuator may include a second fluid valve, the first and second fluid valves being connected to a same fluidic cylinder for actuating the flow restrictor. In this way, the first actuating force and the second actuating force are both applied to the flow restrictor via only a single fluidic cylinder, which enables to simplify the mechanical construction and to enhance the reliability of the turbocharger.

According to some aspects of the present invention, the second actuator some aspects of the present invention an excenter. This enables to perform the step of controlling the second actuator in a simple fashion by letting the excenter rotate synchronizedly with the crank angle variable, thus greatly reducing the amount of processing power required.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

Unless indicated otherwise, like reference numbers throughout the figures indicate like elements.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
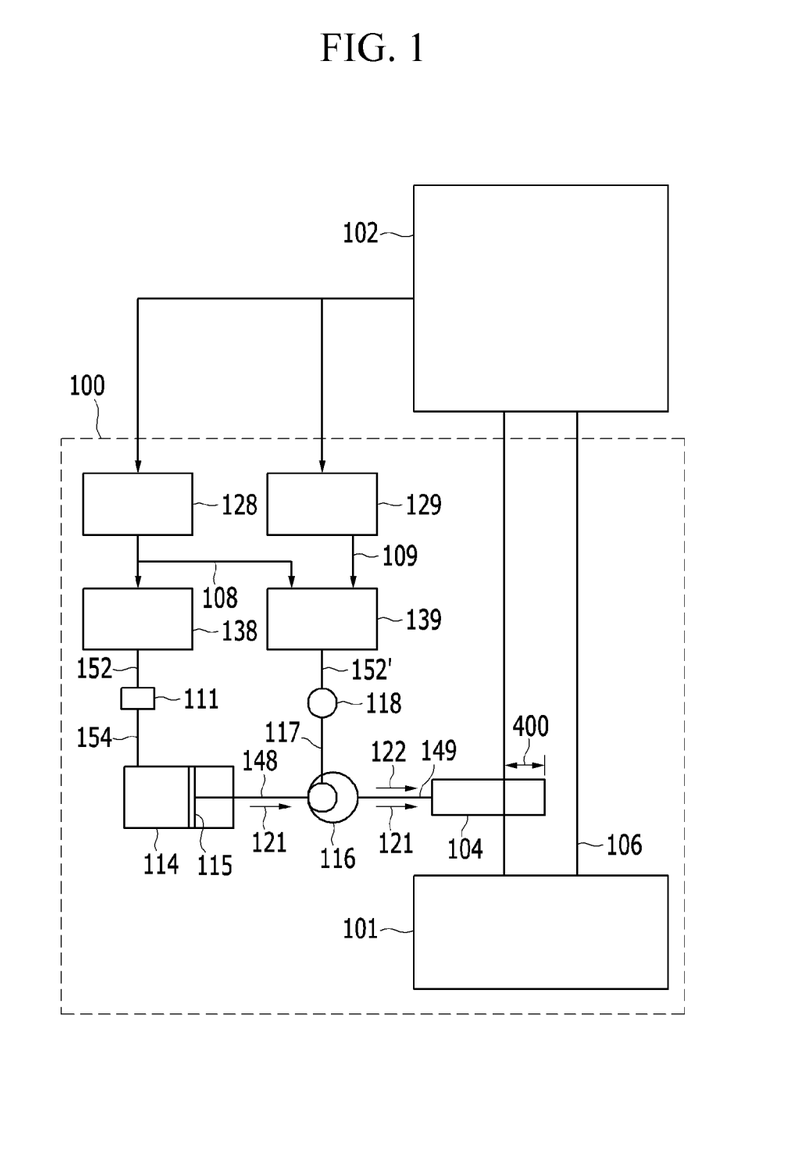
FIG. 1 is a schematic block diagram of a combustion engine with an exemplary turbocharger according to the present invention.

FIG. 1 shows a combustion engine 102 equipped with a turbocharger 100, which includes a turbine 101 connected via a turbine inlet 106 to an exhaust outlet of the combustion engine 102, thus enabling exhaust gas to be guided from the combustion engine 102 into the turbine 101. As in general turbochargers, the turbine 101 is configured to drive a compressor of the turbocharger 100 for pressurizing or boosting an intake air stream of the combustion engine 102. Within the turbine inlet 106 of the turbine 101, a variably positionable flow restrictor 104 is arranged in such a way that depending on the position of the flow restrictor 104 the cross section of the turbine inlet 106 is widened or narrowed. The flow restrictor 104 may be implemented in various ways by any appropriate VGT device, including a sliding wall, sliding annular piston, pivoting vanes, or sliding vanes with fixed vanes attached.

For actuating the flow restrictor 104 to change its position, the turbocharger 100 includes a pneumatic work cylinder 114 having a piston 115 connected via a first actuating rod 148 to an excenter 116, which in succession is connected via a second actuating rod 149 to the flow restrictor 104. The pneumatic cylinder 114 is connected via a pneumatic line 154 to a pneumatic valve 111, which in turn is connected via an electric control line 152 to a first controller 138 of the turbocharger 100. The excenter 116 is connected via a drive shaft 117 to an electric motor 118 configured to drive the excenter 116 in such a way that the distance between the first actuating rod 148 and the second actuating rod 149 is periodically shortened and lengthened. The electric motor 118 is connected via an electric control line 152' to a second controller 139 of the turbocharger 100.

The turbocharger 100 further comprises an operating point variable determiner 128 for determining an operating point variable 108 of the combustion engine. The operating point variable 108 includes at least one of an engine speed and an engine load of the combustion engine 102, and may include further information on the operating point at which the combustion engine is currently operating. For example, the operating point variable determiner 128 may be implemented as an interface to a control device that provides information on the operating point of the combustion engine 102. The operating point variable determiner 128 is connected, for provision of the operating point variable 108, to the first controller 138 and the second controller 139. Also, the turbocharger 100 comprises a crank angle variable determiner 129 for determining a crank angle variable 109 of the combustion engine. The crank angle variable 109 includes information on the current angular position of a crank of the combustion engine 102, such as a numerical value representing the current crank angle or a time since the last passing of a predetermined angular position, e.g. a top dead center of the combustion engine 102. The crank angle variable determiner 129 is connected, for provision of the crank angle variable 109, to the second controller 139. It is noted that while the first 138 and second 139 controllers as well as the operating point variable determiner 128 and the crank angle variable determiner 129 are considered to be part of the turbocharger 100, they are not required to be installed in physical proximity to e.g. the turbine 101 and other parts of the turbocharger 100.

Figure 3:
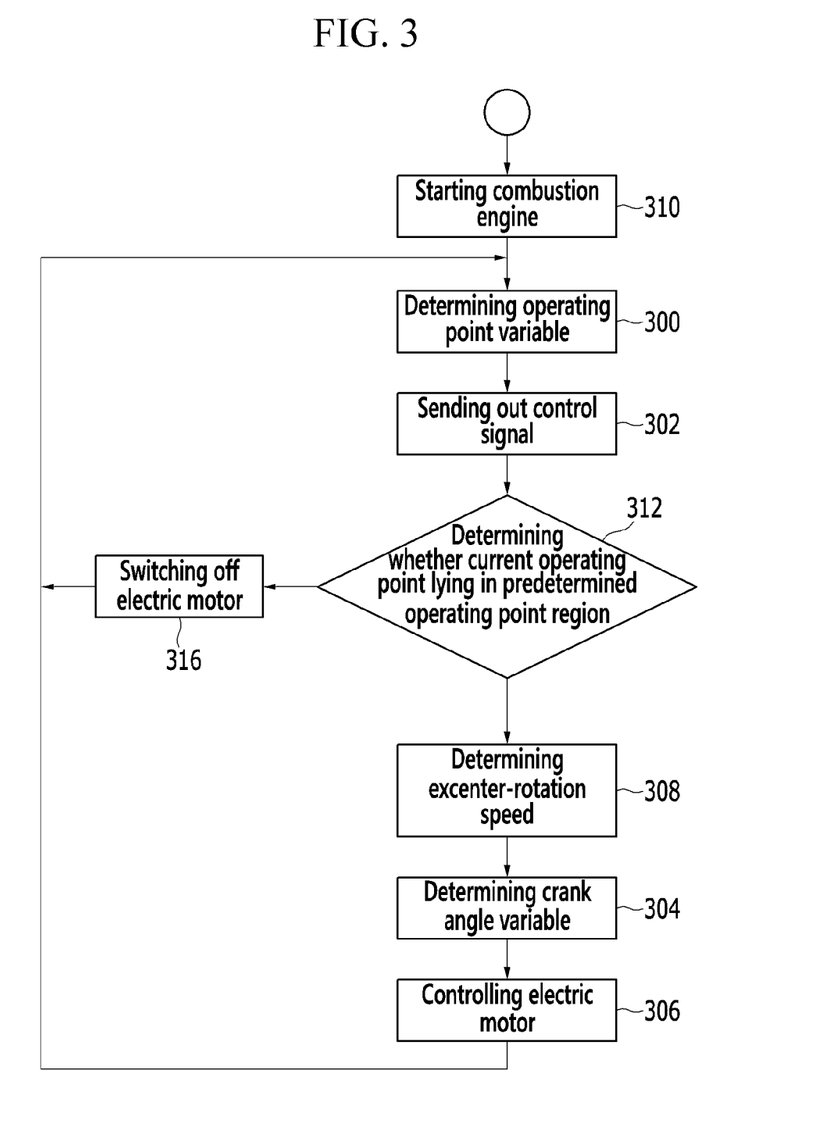
FIG. 3 is a flow diagram of an exemplary method of operating a turbocharger, according to the present invention.

In the following, the operation of the turbocharger 100 shown in FIG. 1 will be explained by making reference to an exemplary method of operating shown as a flowchart in FIG. 3. The method begins with an initial Step 310 of starting the combustion engine 102 with which the turbocharger 100 is installed.

In Step 300, the current engine speed and engine load are determined as an operating point variable 108 that reflects an operating point at which the combustion engine 102 is currently operating. For example, the engine speed and engine load are retrieved from the combustion engine 102 by the operating point variable determiner 128 via a suitable interface (not shown in FIG. 1) such as provided by an on-board control system provided in an automobile (not shown in FIG. 1) where the combustion engine 102 is installed.

In Step 302, the first controller 138 sends out control signals via the electric control line 152 to the pneumatic valve 111 that cause the pneumatic valve 111 to let pass compressed air from a compressed-air source via the pneumatic line 154 into the pneumatic cylinder 114, in order to control the pneumatic cylinder 114 to exert a first actuating force 121 on the piston 115 arranged within the pneumatic cylinder 114. The first actuating force 121 is transferred by the first actuating rod 148 attached to the piston 115 to the excenter 116, and from the excenter 116 via the second actuating rod 149 to the flow restrictor 104. The first controller 138 controls the first actuating force 121 in such a way that the flow restrictor 104 assumes a desired flow restrictor position 400 within the turbine inlet 106 that is appropriate for the current engine operating point in accordance with the engine operating point variable 108 supplied to the first controller 138 in Step 300.

In Step 312, the second controller 139 judges, based on the engine operating point variable 108 supplied to the second controller in Step 300, whether the current operating point of the combustion engine 102 lies in a predetermined operating point region for which the flow restrictor position 400 is intended to be varied synchronizedly with the crank angle variable 109. For example, the operating point variable 108 may be defined to lie within the predetermined operating point region if an engine speed represented by the engine operating point variable 108 is above a predetermined threshold value.

If in Step 312 the second controller 139 judges that the current operating point of the combustion engine 102 lies in the predetermined operating point region, the method proceeds to Step 308 wherein the second controller 139 determines from the current engine speed, which was acquired in Step 300, an excenter-rotation speed at which the excenter 116 has to be rotated to attain synchronization with the crank rotation of the combustion engine 102. In effect, there is provided a modulation function of time, which defines a sinusoidal modulation of the flow restrictor position 400, the modulation function being determined through the shape of the excenter 116 and the excenter-rotation speed.

Then, in Step 304, the crank angle variable determiner 129 determines a crank angle variable 109, which comprises information on the current crank angle of the combustion engine 102, to subsequently provide the crank angle variable 109 to the second controller 139.

In Step 306, the second controller 139 controls the electric motor 118 in such a way that the excenter 116 is rotated, causing the distance between the first actuating rod 148 and the second actuating rod 149 to be lengthened and shortened according to the sinusoidal modulation function provided in Step 304. In this way, while the pneumatic valve 111 and the pneumatic cylinder 114 act together as a first actuator that exerts on the flow restrictor 104 the first actuating force 121 to vary the flow restrictor position 400 depending on the operating point variable 108, the electric motor 118 and the excenter 116 together act as a second actuator that exerts on the flow restrictor 104 a second actuating force 122 to furthermore vary the flow restrictor position 400 depending on the crank angle variable 109. While the first actuating force 121 is transmitted to the flow restrictor 104 from the piston 115 via both the first actuating rod 148 and the second actuating rod 149, being coupled by the excenter 116 and substantially collinearly arranged, the second actuating force 122 is transmitted to the flow restrictor 104 from the excenter 116 via only the second actuating rod 149. Next, the method jumps back to Step 300.

If in Step 312 the second controller 139 judges that the current operating point of the combustion engine 102 does not lie in the predetermined operating point region, the method proceeds to Step 316. In this step, the second controller 139 switches off the electric motor 118 such that the excenter 116 stops at a predetermined stopping position on the course of its rotation. Then, the method jumps back to Step 300.

Figure 2:
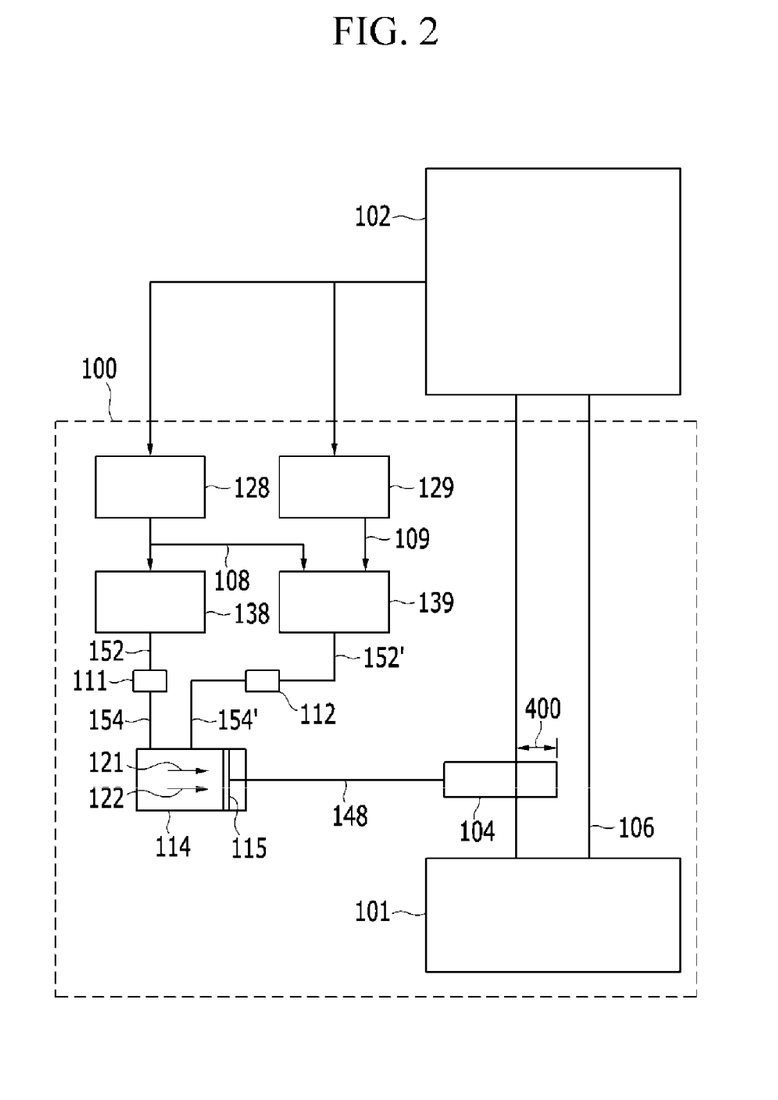
FIG. 2 is a schematic block diagram of a combustion engine with an exemplary turbocharger according to the present invention.

FIG. 2 shows another embodiment of the inventive turbocharger 100. Differently from the embodiment of FIG. 1, the first actuating rod 148 directly connects the piston 115 to the flow restrictor 104. Instead of the electric motor 118 and excenter 116 of the embodiment of FIG. 1, the turbocharger 100 comprises a further pneumatic valve 112 in addition to the pneumatic valve 111 that is present also in the embodiment of FIG. 1. The further pneumatic valve 112 is connected via a further electric control line 152' to the second controller 139, and via a further pneumatic line 154' to the pneumatic cylinder 114. The second controller 139 is configured to send out control signals via the further electric control line 152' to the pneumatic valve 112 that cause the pneumatic valve 111 to let pass compressed air from a compressed-air source via the further pneumatic line 154' into the pneumatic cylinder 114.

In operation, compressed air passed via the further pneumatic valve 112 into the pneumatic cylinder 114 causes a second actuating force 122 to act on the piston 115, together with the first actuating force 121, which is caused by the compressed air passed into the pneumatic cylinder 114 via the pneumatic valve 111. In this way, the first actuating force 121 and the second actuating force 122 are transmitted together via the first actuating rod 148 to the flow restrictor 104.

The turbocharger 100 of the embodiment shown in FIG. 2 can be operated substantially according to the method described above with reference to FIG. 3. Differently from the above, in Step 308 the second controller 139 determines from the operating point variable 108, which was acquired in Step 300, a modulation function of sinusoidal or other shape that defines a modulation of the flow restrictor position 400, e.g. by setting adjustable parameters of a predefined modulation prototype comprising the adjustable parameters, to define the modulation function. In Step 306, the second controller then controls the further pneumatic valve 112 in such a way that the further pneumatic valve 112 together with the pneumatic cylinder 114 acts as a second actuator that, equivalently to the second actuator in the embodiment of FIG. 1, exerts on the flow restrictor 104 the second actuating force 122 to vary the flow restrictor position 400 depending on the crank angle variable 109. Likewise differently from the embodiment of FIG. 1, in Step 316 the second controller 139 closes the further pneumatic valve 112 before jumping back to Step 300.

Figure 2A:
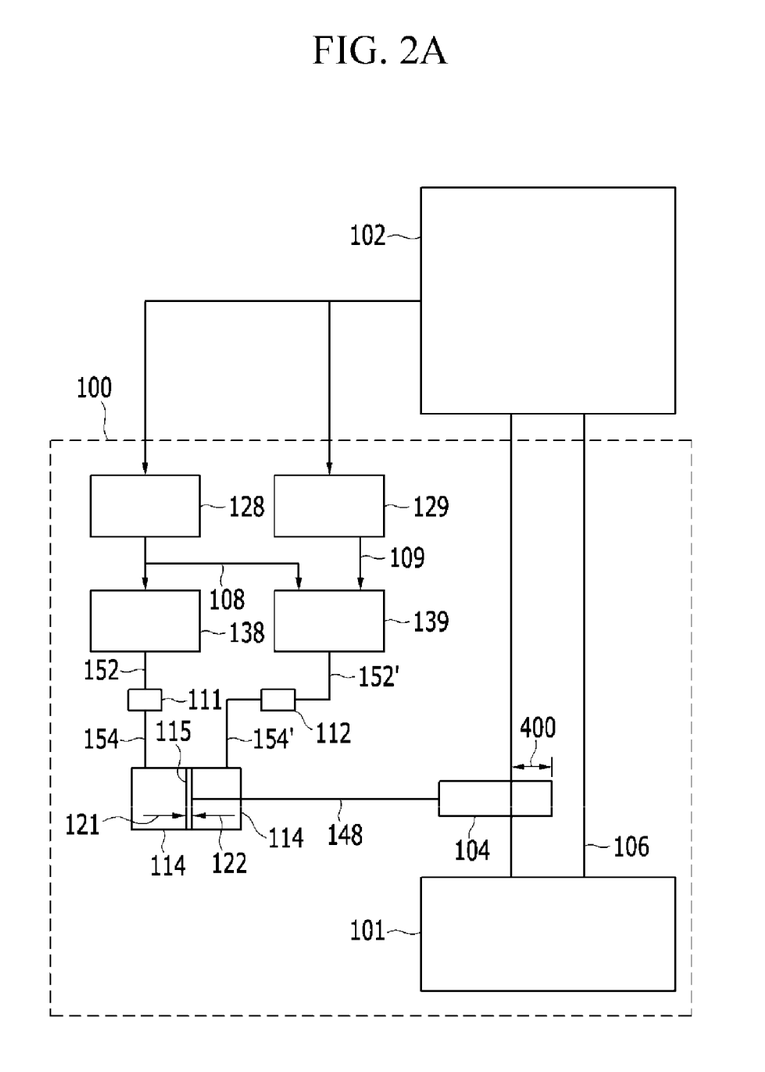
FIG. 2A is a schematic block diagram of a combustion engine with an exemplary turbocharger according to the present invention.

FIG. 2A shows yet another embodiment of the inventive turbocharger 100. Differently from the embodiment of FIG. 2, the pneumatic cylinder 114 is configured as a double-acting cylinder wherein the pneumatic line 154 from the pneumatic valve 111 and the further pneumatic line 154' from the further pneumatic valve 112 are connected to the pneumatic cylinder 114 at opposing sides of the piston 115. Due to this configuration, the first actuating force 121 and the second actuating force 122 act onto the piston 115 from opposite directions. Therefore, the magnitude of the force transferred to the flow restrictor 104 via the first actuating rod 148, which results from a vector addition of the first and second actuating forces 121, 122 is equal to the magnitude of the difference between the magnitude of the first actuating force 121 and the magnitude second actuating force 122.

While the embodiments of FIGS. 1, 2, and 2A have been described as comprising a pneumatic cylinder 114 as way of example, in alternative embodiments the pneumatic cylinder 114 may be replaced by a different kind of fluidic cylinder such as a hydraulic cylinder. In such embodiments, the pneumatic lines 154, 154' and pneumatic valves 111, 112 are configured for the fluid being used, such as pneumatic lines and valves configured for a hydraulic fluid. Furthermore enabled are hybrid embodiments wherein e.g. the first actuating force 121 is hydraulically generated and the second actuating force 122 is pneumatically generated, or vice versa, either by using separate pneumatic and hydraulic cylinders or by using a hybrid cylinder comprising a piston that is acted on by different fluids, e.g. from opposite sides.

Figure 4:
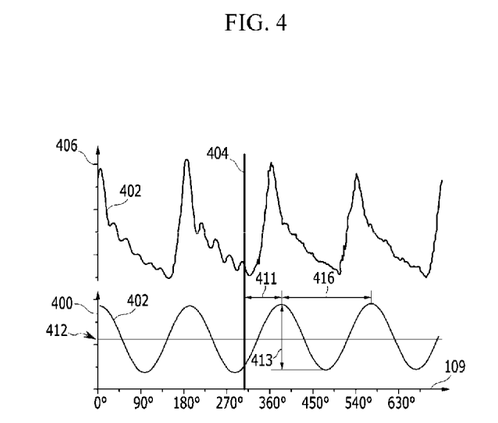
FIG. 4 shows a graph of turbine inlet pressure in an exemplary turbocharger, together with a graph of a flow restrictor position modulation function used in an exemplary method of operating the turbocharger according to the present invention.
Figure 5:
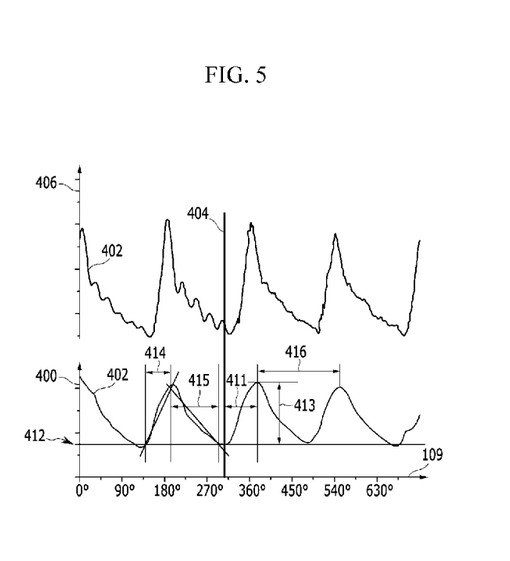
FIG. 5 shows the graph of turbine inlet pressure of FIG. 4, together with another flow restrictor position modulation function used in an exemplary method of operating the turbocharger according to the present invention.

FIG. 5 shows, along a common horizontal axis defining the crank angle as provided e.g. in the crank angle variable 109 in any of the above-described embodiments or variations, and an upper vertical axis 406 defining exhaust gas pressure, a typical variation of the exhaust gas pressure 407 at the exhaust outlet of a combustion engine such as the combustion engine 102 in the above embodiments. In the lower half, along a lower vertical axis defining the flow restrictor position 400, FIG. 4 shows a corresponding example of a modulation function 402 of sinusoidal shape as may be employed in any of the above-described embodiments or variations. For example, in the embodiment of FIG. 1, a sinusoidal modulation function substantially as shown would result from letting the excenter 116 rotate at twice the rotational speed of the crank of the combustion engine 102, and furthermore synchronizing the modulation function with the crank angle by controlling the electric motor 118 such that a prescribed offset angle 411 from the top dead center 404 of the combustion engine 102 is maintained. In this way, the flow restrictor position 400 comes to be sinusoidally modulated with a period 416 that corresponds to a half-circle rotation of the crank angle, around a base level 412 that is controlled in accordance with the operating point of the combustion engine. In the embodiment of FIG. 1, the amplitude 413 of the modulation function is set by selecting an appropriately sized excenter 116, whereas in other embodiments such as the embodiment of FIG. 2 the amplitude 413 may be dynamically set to different values depending on the operating point of the combustion engine.

FIG. 4 shows a diagram substantially as the diagram in FIG. 5 wherein, to provide another embodiment, the sinusoidal modulation function 402 of FIG. 4 has been replaced by a modulation function 402 of a more complex shape. The modulation function 402 of the present embodiment follows the variation of the exhaust gas pressure 407 over the crank angle. A modulation function 402 of this shape and arbitrary other shapes may be employed e.g. in a turbocharger such as given in FIG. 2. As shown, the modulation function 402 may be dynamically provided by setting parameters 411-416 in a predetermined function prototype. In addition to an offset 411 from the top dead center, a base level 12, an amplitude 413, and a period 416, in the present embodiment a positive ramp time 414 during which the modulation function 402 rises and a negative ramp time 415 during which the modulation function 402 falls, are employed. If the sum of positive ramp time 414 and negative ramp time 415 equals the period 416 as in the present embodiment, one of these three parameters 414-416 may replaced by a combination of the two remaining.

Figure 6:
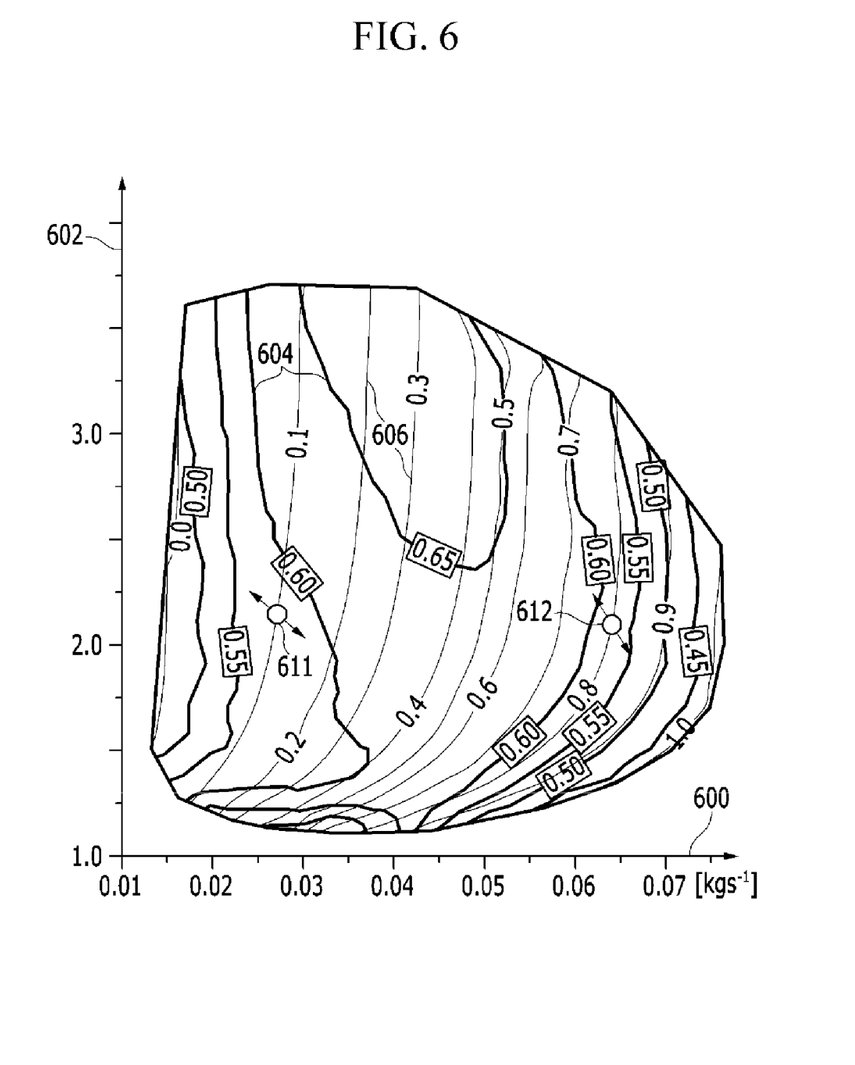
FIG. 6 shows a turbine map of an exemplary turbocharger, with markings for demonstrating the modulation of a flow restrictor position in an exemplary method according to the present invention.

FIG. 6 shows a turbine map of an exemplary turbocharger such as the turbocharger in any of the above-described embodiments or variations. The horizontal axis defines corrected flow 600, while the vertical axis defines the turbine pressure ratio. In the turbine map, there are shown turbine efficiency lines 604 recognizable by framed labels bearing the numerical value of the turbine efficiency, and flow restrictor position lines 606 recognizable by non-framed labels bearing a numerical value for the flow restrictor position wherein 0.00 corresponds to a completely closed turbine inlet and 1.00 to a completely open turbine inlet.

As examples of possible operating points of the combustion engine with which the turbocharger is installed, a first operating point 611 and a second operating point 612 are indicated on the turbine efficiency map. In order to achieve a higher efficiency of the turbine by modulating the flow restrictor position as in the above-described embodiments or variations, at the first operating point 611 a modulation function would be effective that further opens the turbine inlet when the exhaust gas pressure at the exhaust outlet of the combustion engine rises during the pressure pulsations, and further closes the turbine inlet when the exhaust gas pressure at the exhaust outlet falls. In contrast, at the second operating point 612 a modulation function would be effective that further closes the turbine inlet when the exhaust gas pressure at the exhaust outlet rises during the pressure pulsations, and further opens the turbine inlet when the exhaust gas pressure at the exhaust outlet falls. Both kinds of modulation function could be provided by all of the above embodiments. For example, in the embodiment of FIG. 1, the offset of the sinusoidal modulation function provided via the electric motor 118 and excenter 116 can at the first operating point 611 be chosen such that maxima of the modulation function, which correspond to a maximally open turbine inlet, coincide with maxima of the pressure pulsations at the exhaust outlet, whereas at the second operating point 612 the offset of the sinusoidal modulation function can be chosen such that minima of the modulation function, which correspond to a maximally closed turbine inlet, coincide with maxima of the pressure pulsations at the exhaust outlet.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of operating a turbocharger for a combustion engine, the turbocharger including a variably positionable flow restrictor for restricting flow in a turbocharger inlet of the turbocharger by an amount dependent on a flow restrictor position, the method comprising the steps of:
   determining an operating point variable including both of an engine speed and an engine load of the combustion engine by an operating point variable sensor;
   controlling by a first controller, a first actuator to exert, on the flow restrictor, a first actuating force for varying the flow restrictor position depending on the operating point variable;
   determining by a crank angle variable sensor, a crank angle variable including a crank angular position of the combustion engine, wherein the crank angular position is determined independent from the engine speed; and
   controlling by a second controller, a second actuator to exert, on the flow restrictor, a second actuating force for further varying the flow restrictor position depending on the crank angle variable, after the first actuator is controlled based on the operating point variable of the engine speed and the engine load,
   wherein the first and second actuators are engaged to each other and the second actuator is relatively movable with respect to the first actuator according to operation of the first actuator.

2. The method according to claim 1, further comprising a step of providing a modulation function, which defines a desired modulation of the flow restrictor position, wherein the controlling of the second actuator by the second controller is performed based on the modulation function.

3. The method according to claim 2, wherein the modulation function comprises at least one adjustable parameter for adjusting the modulation function, and the step of providing the modulation function comprises determining the at least one adjustable parameter based on the operating point variable.

4. The method according to claim 3, wherein the at least one adjustable parameter comprises at least one of an offset having a crank angle spaced from an angler of a top dead center of the combustion engine, a modulation base level defined on the flow restrictor position, a modulation amplitude of the module function, a positive modulation amplitude ramp time during which the modulation function rises, a negative modulation amplitude ramp time during which the modulation function falls, and a modulation period of the modulation function.

5. The method according to claim 2, wherein the modulation function is sinusoidal.

6. The method according to claim 1, wherein the controlling of the second actuator by the second controller is performed selectively depending on the operating point variable.

7. A computer program product comprising computer non-transitory executable instructions, which when executed by a computer or a control device cause the computer or the control device to perform the method according to claim 1.

8. A turbocharger for a combustion engine, comprising:
   a variably positionable flow restrictor configured for restricting flow in a turbocharger inlet of the turbocharger by an amount dependent on a flow restrictor position;
   an operating point variable sensor configured for determining an operating point variable including both of an engine speed and an engine load of the combustion engine;
   a first actuator configured for exerting, on the flow restrictor, a first actuating force for varying the flow restrictor position depending on the operating point variable;
   a crank angle variable sensor configured for determining a crank angle variable including a crank angular position of the combustion engine, wherein the crank angular position is determined independent from the engine speed; and
   a second actuator configured for exerting, on the flow restrictor, a second actuating force for further varying the flow restrictor position depending on the crank angle variable after the first actuator is controlled based on the operating point variable of the engine speed and the engine load,
   wherein the first and second actuators are engaged to each other and the second actuator is relatively movable with respect to the first actuator according to operation of the first actuator.

9. The turbocharger according to claim 8, wherein at least one of the first and/or second actuators comprises a fluidic actuator.

10. The turbocharger according to claim 9, wherein the first actuator comprises a first fluid valve and the second actuator comprises a second fluid valve, the first and second fluid valves being connected to a same fluidic cylinder for actuating the flow restrictor.

11. The turbocharger according to claim 8, wherein the second actuator comprises an excenter.

12. A combustion engine equipped with the turbocharger according to claim 8.

* * * * *